(12) United States Patent
Dalsgaard et al.

(10) Patent No.: US 9,386,601 B2
(45) Date of Patent: Jul. 5, 2016

(54) ACTIVATING COMPONENT CARRIERS IN A CARRIER AGGREGATION

(75) Inventors: Lars Dalsgaard, Oulu (FI); Jussi Ojala, Helsinki (FI); Jorma Kaikkonen, Oulu (FI); Matti Jokimies, Salo (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/522,294

(22) PCT Filed: Nov. 3, 2010

(86) PCT No.: PCT/FI2010/050883
§ 371 (c)(1),
(2), (4) Date: Sep. 14, 2012

(87) PCT Pub. No.: WO2011/086228
PCT Pub. Date: Jul. 21, 2011

(65) Prior Publication Data
US 2012/0327910 A1 Dec. 27, 2012

Related U.S. Application Data

(60) Provisional application No. 61/297,322, filed on Jan. 22, 2010, provisional application No. 61/336,191, filed on Jan. 15, 2010.

(51) Int. Cl.
*H04W 72/04* (2009.01)
*H04W 74/00* (2009.01)
(Continued)

(52) U.S. Cl.
CPC ............. *H04W 74/006* (2013.01); *H04L 5/001* (2013.01); *H04L 5/003* (2013.01); *H04L 5/0096* (2013.01);
(Continued)

(58) Field of Classification Search
CPC .............................. H04B 7/2628; H04W 84/18
USPC .................................. 370/335, 329, 328, 310
See application file for complete search history.

(56) References Cited

U.S. PATENT DOCUMENTS

| | | | |
|---|---|---|---|
| 2002/0100799 A1* | 8/2002 | Daugaard | 235/380 |
| 2010/0074120 A1* | 3/2010 | Bergman et al. | 370/244 |
| 2010/0098012 A1* | 4/2010 | Bala et al. | 370/329 |

FOREIGN PATENT DOCUMENTS

| | | |
|---|---|---|
| CN | 101189903 A | 5/2008 |
| CN | 101547477 A | 9/2009 |

(Continued)

OTHER PUBLICATIONS

"Carrier Activation and De-activation", 3GPP TSG-RAN WG2 #68, R2-096502, Agenda Item: 7.3.3, CATT, Nov. 9-13, 2009, 3 pages.
(Continued)

*Primary Examiner* — Andrew Lai
*Assistant Examiner* — Zhiren Qin
(74) *Attorney, Agent, or Firm* — Harrington & Smith

(57) ABSTRACT

In an exemplary embodiment there is sent to a user equipment UE downlink control information DCI comprising an indication of an access codeword and an indication that at least one component carrier CC is activated for the UE, and there is received from the UE the access codeword which is an acknowledgement that the UE has activated the at least one CC. The access codeword is received on an uplink channel which a) lies in the at least one activated CC if there is an activated uplink channel in the activated CC, or b) is previously activated if there is no activated uplink channel in the activated CC. In another embodiment DCI comprising the above two indications is received from a network, the received indications are used to select and access the at least one CC; and activating the CC is acknowledged by sending the access codeword.

22 Claims, 7 Drawing Sheets

(51) Int. Cl.
  *H04L 1/16* (2006.01)
  *H04L 5/00* (2006.01)
  *H04W 28/04* (2009.01)

(52) U.S. Cl.
  CPC ............. *H04L 5/0098* (2013.01); *H04L 1/1607* (2013.01); *H04L 5/0007* (2013.01); *H04W 28/04* (2013.01); *H04W 72/042* (2013.01); *H04W 72/0453* (2013.01)

(56) References Cited

FOREIGN PATENT DOCUMENTS

| EP | 2187691 A1 | 5/2010 |
|---|---|---|
| WO | 2009/021012 A2 | 2/2009 |
| WO | 2010/094325 A1 | 8/2010 |

OTHER PUBLICATIONS

"Discussions on CC Configuration", 3GPP TSG-RAN WG2 Meeting #68, R2-096997, Agenda: 7.3.4, Fujitsu, Nov. 9-13, 2009, pp. 1-3.

"Activation and Deactivation of Component Carriers", 3GPP TSG-RAN WG2 #68, R2-096752, Agenda Item: 7.3.3, Ericsson, ST-Ericsson, Oct. 9-13, 2009, pp. 1-4.

"Activation and Deactivation of Component Carriers", 3GPP TSG-RAN WG2 #67-bis, R2-095808, Agenda Item: 07.3.3, Ericsson, ST-Ericsson, Oct. 12-16, 2009, pp. 1-3.

"3rd Generation Partnership Project; Technical Specification Group Radio Access Network; Evolved Universal Terrestrial Radio Access (E-UTRA); Multiplexing and Channel Coding (Release 8)", 3GPP TS 36.212, V8.7.0, May 2009, pp. 1-60.

"3rd Generation Partnership Project; Technical Specification Group Radio Access Network; Multiplexing and Channel Coding (FDD) (Release 8)", 3GPP TS 25.212, V8.6.0, Sep. 2009, pp. 1-107.

"3rd Generation Partnership Project; Technical Specification Group Radio Access Network; Physical Layer Procedures (FDD) (Release 8)", 3GPP TS 25.214, V8.8.0, Dec. 2009, pp. 1-93.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300, V8.6.0, Sep. 2008, pp. 1-137.

"Initial Random Access in Asymmetric Carrier Aggregation", 3GPP TSG RAN WG1 Meeting #55bis, R1-090093, Agenda Item: 12.2, Samsung, Jan. 12-16, 2009, 3 pages.

International Search Report and Written Opinion received for corresponding Patent Cooperation Treaty Application No. PCT/FI2010/050883, dated Mar. 28, 2011, 14 pages.

* cited by examiner

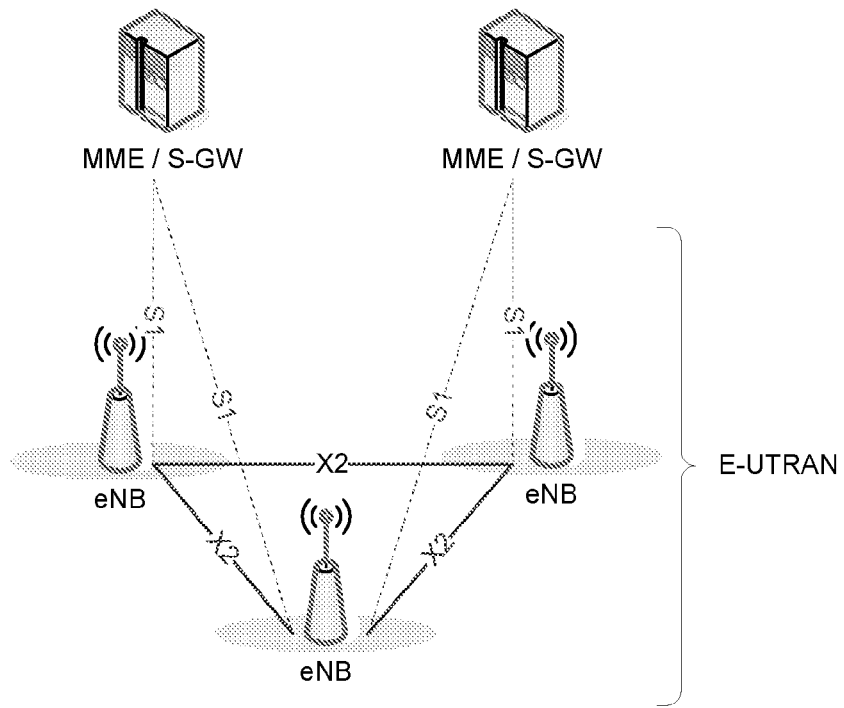
Figure 1A: Prior Art
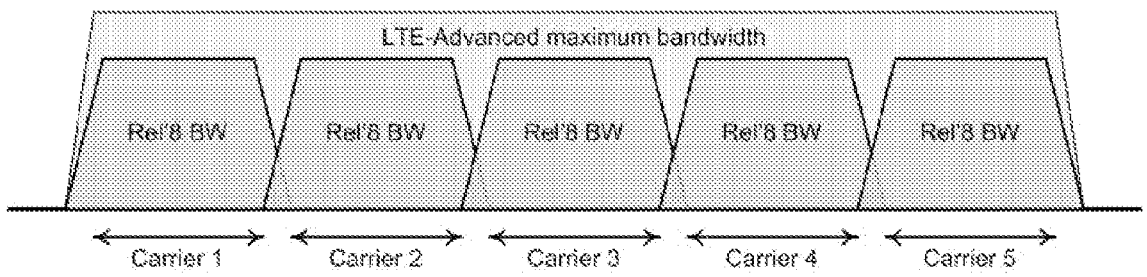
Figure 1B: Prior Art

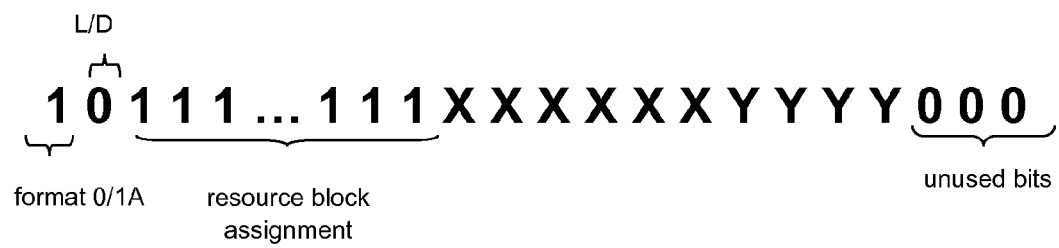
Figure 2A: Prior Art
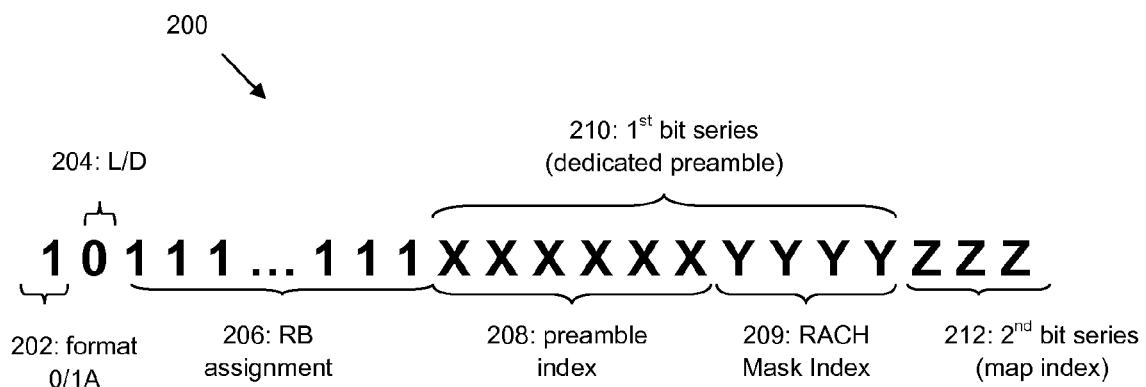
Figure 2B

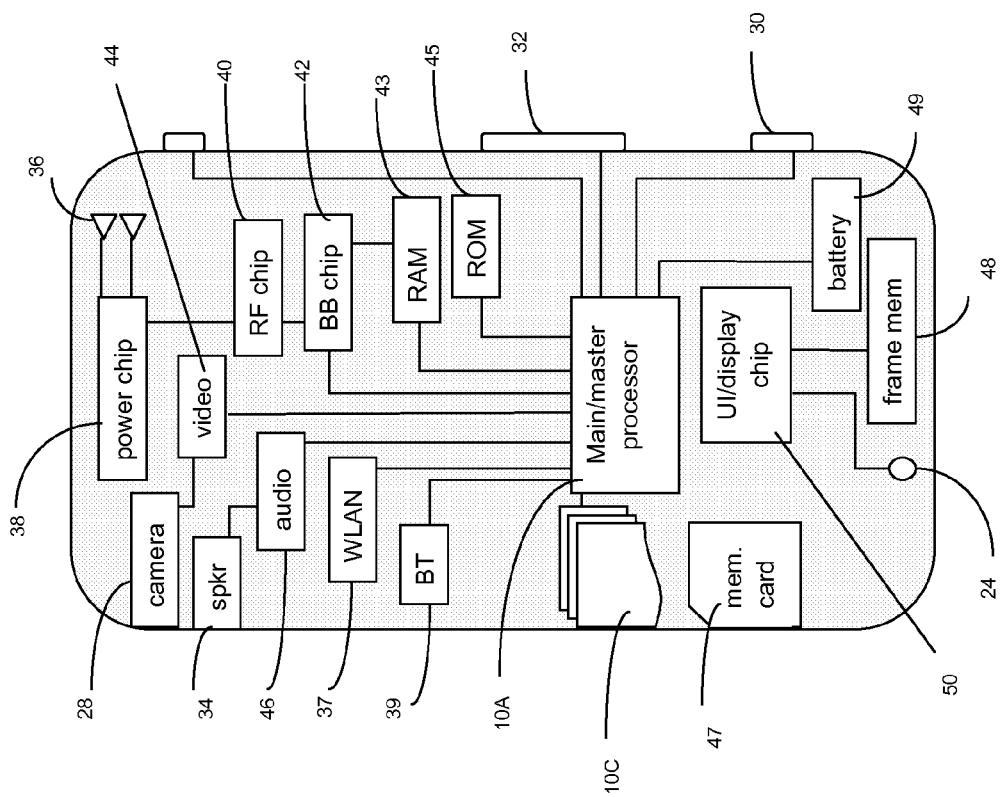
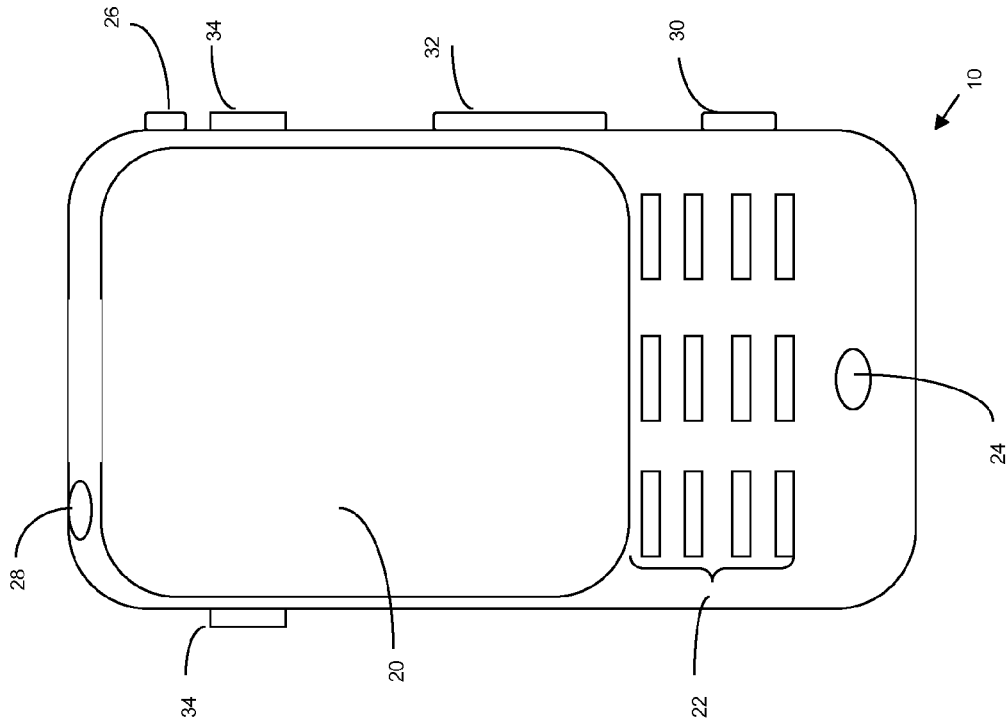
Figure 5B

602: send to a UE DL control information (PDCCH format) comprising:
- an indication of an access codeword, and
- an indication that at least one CC of a plurality of aggregated CCs is activated for the UE.

604: receive from the UE on an uplink channel the access codeword which is an acknowledgement that the UE has activated the at least one CC, in which the uplink channel:
 lies in the at least one activated CC for the case in which there is an activated UL channel in the at least one activated CC; or
 is a previously activated UL channel for the case in which there is no activated UL channel in the at least one activated CC

Figure 6A

622: receive from a network downlink control information comprising:
- an indication of an access codeword, and
- an indication that at least one selected CC of a plurality of aggregated CCs is activated for a UE 624: use the received indications to select and access the at least one CC 622: acknowledge that the at least one CC is activated by sending the access codeword:
 on a UL channel which lies in the at least one activated CC for the case in which there is an activated UL channel in the at least one activated CC; or
 on a previously activated UL channel for the case in which there is no activated UL channel in the at least one activated CC

Figure 6B

ACTIVATING COMPONENT CARRIERS IN A CARRIER AGGREGATION

RELATED APPLICATION

This application was originally filed as PCT Application No. PCT/FI2010/050883 filed Nov. 3, 2010, which claims priority benefit to U.S Provisional Patent Application No. 61/336,191, filed Jan. 15, 2010 and U.S. Provisional Patent Application No. 61/297,322, filed Jan. 22, 2010.

TECHNICAL FIELD

The exemplary and non-limiting embodiments of this invention relate generally to wireless communication systems, methods, devices and computer programs and, more specifically, relate to activating/de-activating a component carrier in a system which employs carrier aggregation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACK acknowledgment
ARQ automatic repeat request
CA carrier aggregation
CIF carrier indicator field
CC component carrier
DCI downlink control information
DL downlink (eNB to UE)
eNB EUTRAN Node B (evolved Node B/base station)
E-ARFCN E-UTRA absolute radio frequency channel number
EPC evolved packet core
E-UTRAN evolved UTRAN (LTE)
HARQ hybrid ARQ
IMT international mobile telecommunications
ITU-R international telecommunication union-radio
LTE long term evolution
MM/MME mobility management/mobility management entity
MIMO multiple input multiple output
MU multi-user
NACK negative ACK
OFDMA orthogonal frequency multiple division access
PC power control
PDCCH physical downlink control channel
PDSCH physical downlink shared channel
PUSCH physical uplink shared channel
RACH random access channel
RRC radio resource control
SC-FDMA single carrier, frequency division multiple access
TA time alignment
UE user equipment
UL uplink (UE to eNB)
UTRAN universal terrestrial radio access network In the communication system known as evolved UTRAN (E-UTRAN, also referred to as UTRAN-LTE, E-UTRA or 3.9G), the LTE Release 8 is completed, the LTE Release 9 is being standardized, and the LTE Release 10 is currently under development within the 3GPP. In LTE the downlink access technique is OFDMA, and the uplink access technique is SC-FDMA, and these access techniques are expected to continue in LTE Release 10.

FIG. 1A reproduces FIG. 4-1 of 3GPP TS 36.300, V8.6.0 (2008-09), and shows the overall architecture of the E-UTRAN system. The EUTRAN system includes eNBs, providing the EUTRA user plane and control plane (RRC) protocol terminations towards the UE. The eNBs are interconnected with each other by means of an X2 interface. The eNBs are also connected by means of an S1 interface to an EPC, more specifically to a MME and to a Serving Gateway. The S1 interface supports a many to many relationship between MMES/Serving Gateways and the eNBs.

Of particular interest herein are the further releases of 3GPP LTE targeted towards future IMT-Advanced systems, referred to herein for convenience simply as LTE-Advanced (LTE-A). LTE-A is directed toward extending and optimizing the 3GPP LTE Release 8 radio access technologies to provide higher data rates at very low cost. LTE-A will most likely be part of LTE Release 10. LTE-A is expected to use a mix of local area and wide area optimization techniques to fulfill the ITU-R requirements for IMT-Advanced while keeping the backward compatibility with LTE Release 8. Topics that are included within the ongoing study item include bandwidth extensions beyond 20 MHz, among others.

The bandwidth extension beyond 20 MHz in LTE-Advanced (for example, beyond 20 MHz but aggregations of larger or smaller component carriers is to be done via carrier aggregation (CA), in which several Release 8 compatible carriers are aggregated together to form a system bandwidth. This is shown by example at FIG. 1B in which there are 5 Release 8 compatible CCs aggregated to form one larger LTE-Advanced bandwidth. The purpose for aggregating individual e.g. 20 MHz Release 8 compatible component carriers (CCs) is that each existing Release 8 terminal can receive and/or transmit on one of the CCs, whereas future LTE-Advanced terminals could potentially receive/transmit on multiple CCs at the same time, thus having support for large bandwidth. FIG. 1B is specific to LTE-Advanced but makes clear the general concept of CA regardless of what size the CCs; for example smaller frequency chunks such as 10 MHz CCs can be aggregated to get a 20 MHz bandwidth and CCs can be made larger than 20 MHz. LTE Release 8 allows bandwidths of 1.4 MHz, 5 MHz and 10 MHz as well as 20 MHz, so any of these may be the size of a CC.

In LTE Release 8, the PDCCH could only be used to indicate a PDSCH/PUSCH sent on its own DL CC or its paired UL CC. For Release 10 UEs there is the possibility that the eNB and the UE can use more than one cell for communication on more than one frequency band (more than one CC). In order to facilitate this functionality there is a need to find solutions to how to potentially activate and deactivate usage of CA.

There is already specified the concept of cross CC scheduling, so that an allocation (for example on a PDCCH) sent by the eNB on one CC (cell) can schedule/allocate radio resources on a different CC (cell). In this cross CC scheduling grant there is a 3 bit Carrier Indication Field (CIF), added to the DCI format, which indicates on which CC the allocated resources lie. The PDCCH is sent on a per cell basis, so where there are multiple CCs the PDCCH is described as being sent on a cell of a specific CC. It is undecided if the CIF meaning can be different for UL and DL.

It is considered also that the Release 10 UEs may not necessarily be scheduled across the entire five CCs shown by example at FIG. 1B (or however many total CCs there are in the whole bandwidth), but rather there is a subset of them for which the UE is configured, via RRC signaling. This avoids the UE having to blind detect on every possible CC in the whole bandwidth to find its PDCCH, a power intensive operation. From the UE's configured set of CCs (which it the UE's CA), there must then be a more dynamic way than RRC signaling to coordinate between the eNB and the UE exactly which CCs are active, and so a mechanism to activate and de-activate cells/individual CCs which belong to the UE's configured CC set. RRC signaling is not considered effective for this purpose because its semi-static nature would impose too much delay especially given inherent delays and time uncertainty introduced due to HARQ and ARQ when activating and/or de-activating any CC.

Relevant proposals in this regard have been presented to 3GPP, including: R2-096502 (3GPP TSG-RAN WG2 #68 "Carrier activation and de-activation" by GATT, Nov. 9-13, 2009); R2-096997 (3GPP TSG-RAN WG2 #68 "Discussions of CC configuration" by Fujitsu, Nov. 9-13, 2009); R2-096752 (3GPP TSG-RAN WG2 #68 "Activation and de-activation of component carriers" by Eriksson and ST-Eriksson, Nov. 9-13, 2009); and R2-095808 (3GPP TSG-RAN WG2 #67-bis "Activation and de-activation of component carriers" by Eriksson and ST-Eriksson, Oct. 12-16, 2009). There is also in UTRAN Release 8 a dual cell-HSPDA operation which in part includes a HS-SCCH order based activation/de-activation of a secondary downlink carrier was specified, and there is also a dual cell HSUPA operation in the UTRAN Release 9. See for example 3GPP TS 25.212 and 25.214.

SUMMARY

The foregoing and other problems are overcome, and other advantages are realized, by the use of the exemplary embodiments of this invention.

In a first aspect thereof the exemplary embodiments of this invention provide a method comprising: sending downlink control information to a user equipment, the downlink control information comprising an indication of an access codeword and an indication that at least one component carrier of a plurality of aggregated component carriers is activated for the user equipment; and receiving from the user equipment the access codeword which is an acknowledgement that the user equipment has activated the at least one component carrier. In this aspect the access codeword is received on an uplink channel which lies in the at least one activated component carrier for the case in which there is an activated uplink channel in the said at least one activated component carrier, or the access codeword is received on a previously activated uplink channel for the case in which there is no activated uplink channel in the at least one activated component carrier.

In a second aspect thereof the exemplary embodiments of this invention provide a memory storing a program of computer readable instructions which when executed by at least one processor result in actions comprising: sending downlink control information to a user equipment, the downlink control information comprising an indication of an access codeword and an indication that at least one component carrier of a plurality of aggregated component carriers is activated for the user equipment; and receiving from the user equipment the access codeword which is an acknowledgement that the user equipment has activated the at least one component carrier. In this aspect the access codeword is received on an uplink channel which lies in the at least one activated component carrier for the case in which there is an activated uplink channel in the said at least one activated component carrier, or the access codeword is received on a previously activated uplink channel for the case in which there is no activated uplink channel in the at least one activated component carrier.

In a third aspect thereof the exemplary embodiments of this invention provide an apparatus comprising at least one processor and at least one memory including computer program code. The at least one memory and the computer program code are configured, with the at least one processor, to cause the apparatus to perform at least: sending downlink control information to a user equipment, the downlink control information comprising an indication of an access codeword and an indication that at least one component carrier of a plurality of aggregated component carriers is activated for the user equipment; and receiving from the user equipment the access codeword which is an acknowledgement that the user equipment has activated the at least one component carrier. In this aspect the access codeword is received on an uplink channel which lies in the at least one activated component carrier for the case in which there is an activated uplink channel in the said at least one activated component carrier, or the access codeword is received on a previously activated uplink channel for the case in which there is no activated uplink channel in the at least one activated component carrier.

In a fourth aspect thereof the exemplary embodiments of this invention provide an apparatus comprising sending means and receiving means. The sending means is for sending downlink control information to a user equipment, the downlink control information comprising an indication of an access codeword and an indication that at least one component carrier of a plurality of aggregated component carriers is activated for the user equipment. The receiving means is for receiving from the user equipment the access codeword which is an acknowledgement that the user equipment has activated the at least one component carrier. In this aspect the access codeword is received on an uplink channel which lies in the at least one activated component carrier for the case in which there is an activated uplink channel in the said at least one activated component carrier, or the access codeword is received on a previously activated uplink channel for the case in which there is no activated uplink channel in the at least one activated component carrier. In a particular embodiment the sending means comprises a transmitter and the receiving means comprises a receiver.

In a fifth aspect thereof the exemplary embodiments of this invention provide a method comprising: receiving downlink control information from a network, the downlink control information comprising an indication of an access codeword and an indication that at least one component carrier of a plurality of aggregated component carriers is activated for a user equipment; using the received indications to select and access the at least one component carrier; and acknowledging that the at least one component carrier is activated by sending the access codeword to the network. In this aspect the access codeword is sent on an uplink channel which lies in the at least one activated component carrier for the case in which there is an activated uplink channel in the said at least one activated component carrier, or the access codeword is sent on a previously activated uplink channel for the case in which there is no activated uplink channel in the at least one activated component carrier.

In a sixth aspect thereof the exemplary embodiments of this invention provide a memory storing a program of computer readable instructions which when executed by at least one processor result in actions comprising: receiving downlink control information from a network, the downlink control information comprising an indication of an access codeword and an indication that at least one component carrier of a plurality of aggregated component carriers is activated for a user equipment; using the received indications to select and access the at least one component carrier; and acknowledging that the at least one component carrier is activated by sending the access codeword to the network. In this aspect the access codeword is sent on an uplink channel which lies in the at least one activated component carrier for the case in which there is an activated uplink channel in the said at least one activated component carrier, or the access codeword is sent on a previously activated uplink channel for the case in which there is no activated uplink channel in the at least one activated component carrier.

In a seventh aspect thereof the exemplary embodiments of this invention provide an apparatus comprising at least one processor and at least one memory including computer program code. The at least one memory and the computer program code are configured, with the at least one processor, to cause the apparatus to perform at least: receiving downlink control information from a network, the downlink control information comprising an indication of an access codeword and an indication that at least one component carrier of a plurality of aggregated component carriers is activated for a user equipment; using the received indications to select and access the at least one component carrier; and acknowledging that the at least one component carrier is activated by sending the access codeword to the network. In this aspect the access codeword is sent on an uplink channel which lies in the at least one activated component carrier for the case in which there is an activated uplink channel in the said at least one activated component carrier, or the access codeword is sent on a previously activated uplink channel for the case in which there is no activated uplink channel in the at least one activated component carrier.

In an eighth aspect thereof the exemplary embodiments of this invention provide an apparatus comprising receiving means, selecting means and communication means. The receiving means is for receiving downlink control information from a network, the downlink control information comprising an indication of an access codeword and an indication that at least one component carrier of a plurality of aggregated component carriers is activated for a user equipment. The selecting means is for using the received indications to selecting and accessing the at least one component carrier. And the communication means is for acknowledging that the at least one component carrier is activated by sending the access codeword to the network. In this aspect the access codeword is sent on an uplink channel which lies in the at least one activated component carrier for the case in which there is an activated uplink channel in the said at least one activated component carrier, or the access codeword is sent on a previously activated uplink channel for the case in which there is no activated uplink channel in the at least one activated component carrier. In a particular embodiment the receiving means comprises a receiver, the selecting means comprises at least one processor, and the communication means comprises a transmitter.

BRIEF DESCRIPTION OF THE DRAWINGS

FIG. 1A reproduces FIG. 4-1 of 3GPP TS 36.300 (v8.6.0), and shows the overall architecture of the E-UTRAN system.

FIG. 1B is a schematic diagram of a radio spectrum in which cross-scheduling can be employed, in which five component carrier bandwidths are aggregated into a single LTE-Advanced bandwidth.

FIG. 2A is a prior art DCI format 1A which is sent to the UE.

FIG. 2B is an exemplary embodiment of a DCI format 1AA which is sent to the UE to activate a CC according to an exemplary embodiment of the invention.

FIG. 5B shows a more particularized block diagram of a user equipment such as that shown at FIG. 5A.

FIGS. 6A-B are logic flow diagrams that illustrates the operation of a method, and a result of execution of computer program instructions embodied on a computer readable memory, in accordance with the exemplary embodiments of this invention from the respective perspectives of a network access node and a user equipment.

DETAILED DESCRIPTION

Figure 3:
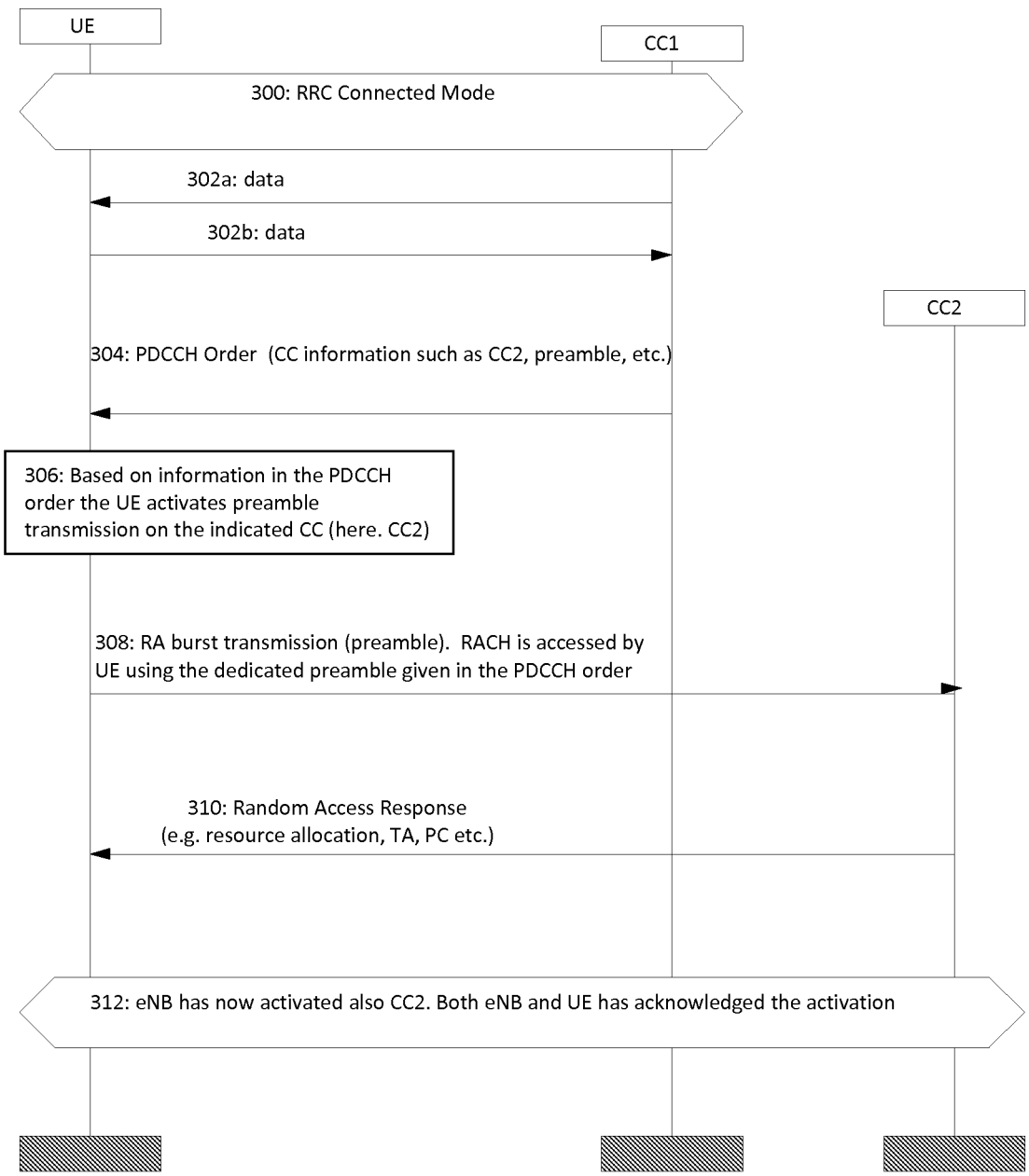
FIG. 3 is a signaling diagram showing a UE connected with CC1 and signaled on CC1 to activate CC2 according to an exemplary embodiment of the invention.

As noted above, a mechanism to activate and de-activate individual CCs for a UE is needed, something other than RRC signaling so as to be responsive enough and also reliable in the sense that both the eNB and UE agree at the "same time" whether and when a certain cell in a CC is available to be used for CA.

According to an exemplary embodiment of the invention there is sent from the eNB to the affected UE a "PDCCH order" which combines a CC activation indication with an indication of a codeword or preamble to be used to access the newly activated CC. By example the CC activation indication may be a 1-bit field in the DCI format 1A (see for example 3GPP TS 36.212 v8.7.0 sec. 5.3.3.1.3), as modified to accommodate this CC activation indication. By example and not by way of limitation this new DCI format may be termed DCI format 1AA, identical in length to the prior art DCI format 1A but with certain bit fields re-defined as detailed by example below. Specifically, in an embodiment one or more of the bits that are zero'd out in the prior art DCI format 1A (so they carry no useful information and are ignored by the UE in the prior art) are made operative in the exemplary embodiment DCI format 1AA according to these teachings so as to carry information about exactly which CC (or which multiple CCs) is being activated. Said another way, in an exemplary embodiment of the invention that one bit (or multiple bits) points to the UL/DL CC pair that should be activated. For the case where more than one bit is used to indicate which CC is being activated, those bits may select from a bitmap an index which corresponds to the CC or CCs being activated.

FIG. 2A illustrates the prior art PDCCH order format 1A, specified in LTE Release 8 (see for example 3GPP TS 36.212 ver 8.7.0[2009-05], chapter 5.3.3.1.3). There is a format bit which informs whether the DCI is format 0 or 1A, in this case indicating format 1A. There is a localized/distributed bit and a resource block assignment bit string that in the format 1A is set to all 1's. At the tail end of the portion of the PDCCH order format 1A are shown three bits which are zero'd out in all cases of format 1A. These zero'd out bits carry no useful information to the UE, and are ignored by the UE. Their purpose is to keep a certain length to the format 1A string. The number of unused bits varies slightly depending on whether the configuration is TDD or FDD mode.

FIG. 2B is an example embodiment of a DCI format 1AA according to these teachings, illustrated only to show the concept and not as a limitation. FIG. 2B illustrates a PDCCH order, which is more generically termed simply downlink control information. The particular embodiment of the DCI format 1AA shown at FIG. 2B derives from the PDCCH order, DCI format 1A shown at FIG. 2A, but other embodiments of the invention may differ in other respects also. Both the conventional PDCCH order of FIG. 2A and the example embodiment format 1AA of FIG. 2B are identified by a resource block assignment (RBA) string in which all bits are set as '1'. The inventors have identified that one or more of the un-used bits in that conventional PDCCH order format 1A at FIG. 2A can be used in the example inventive PDCCH order format 1AA for CC mapping purposes.

Specifically, FIG. 2B is a downlink control indicator/PDCCH order 200 which comprises the following discrete portions. There is a first format selector 202 which tells the UE whether this DCI is format 0 or format 1A. There is next a localized/distributed flag portion 204, a resource block assignment portion 206 (which by example is set to all 1's for DCI format 1A and 1AA), and a first bit series or bit string 210 which includes both a preamble index portion 208 and a primary RACH (PRACH) mask index 209. The first bit string or bit series 210 in the format 1AA of FIG. 2B gives an indication for a dedicated preamble (or more generically, an access codeword) to use in a random access procedure when accessing the activated CC. By example this first bit series 210 is an index to a codebook stored in a local memory of the eNB and the UE, and gives a UE dedicated preamble that is used in the RACH access procedure as will be shown at FIGS. 3 and 4. There is a second bit string or bit series 212, which in an embodiment include one or more of those un-used bits of the prior art noted above, which is the indication as to which CC is being activated. In this particular embodiment of FIG. 2B, the $2^{nd}$ bit series serves a dual function: it selects between DCI formats 1A and 1AA as well as indicating the CC mapping as noted above. For the case in which the format 1AA of FIG. 2B is the same length as the conventional format 1A of FIG. 2A and further that the $2^{nd}$ bit series 212 is in index into a bitmap that gives the CC or CCs being activated, it is preferable to avoid having an all zero's entry in the bitmap since the presence of a non-zero bit in the $2^{nd}$ bit series can in an embodiment be used to distinguish the PDCCH order between format 1AA as in FIG. 2B and the conventional format 1A shown at FIG. 2A.

There may be one or more than one bit in the second bit series 212 put into use for indicating and mapping to at least one CC being activated. In an example embodiment there is only a single bit in that second bit series 212 which carries CC activation information in the format 1AA embodiment, and that single bit activates multiple CCs. While in DCI format 1AA 200 the second bit string 212 is still longer than that single bit, the remaining bits if any, except that one bit, can be zero'd in all cases of DCI format 1AA and therefore ignored by the UE, just as that entire section is ignored by the UE once it sees they are all zeros indicating that the DCI 200 is format 1A.

Note that FIG. 2B is an example embodiment; the various bit series and indexes can be in a different order in other embodiments of the invention than the order shown at FIG. 2B.

Of course the same bit or second bit string 212 may be used to de-activate the same individual CC or multiple CCs for the de-activation procedure. There are at least two ways to relate the de-activation procedure to the activation procedures which are detailed particularly below by example. In a first de-activation relationship, the value of the CC activation indication maps to the same entry of the bitmap for activation and de-activation, and the UE knows whether the indication is to activate or de-activate based on whether or not that mapped CC or CCs are currently activated or not activated. In this first de-activation relationship the UE sees that the second bit series 212 maps to a CC or CCs and changes the activation status of that mapped CC or CCs from their current activation state. In a second de-activation relationship, it is known from the second bit series 212 whether a CC or CCs is/are being activated or de-activated because any given index in the bitmap is for either activating or de-activating a CC.

An alternative way to signal activation/de-activation of a CC in the UE's configured set is to link the second bit field or bit series 212 containing the activation information to the RRC configuration of the CCs. This works in a manner similar to sending measurement reports in legacy systems in which the meaning of the bit depends on the RRC-signaled configuration of the UE. A first bitmap is used to map the second bit series 212 to select at least one CC if the RRC configuration of the CCs for the UE is a first configuration, a second bitmap is used to map the second bit series 212 to select a CC if the RRC configuration is a second configuration, and so forth. So there is effectively a different bitmap per CC configuration, giving the eNB more flexibility to map using a small number of bits. Of course these different bitmaps can be combined into one, with an additional entry for CC configuration to get the proper CC selection from the signaled second bit series 212.

For example, if the UE is configured for carrier aggregation of CC #s 1 and 2 of FIG. 1B, a second bit series 212 having value 011 may map to indicate that CC#2 is activated. But if the UE is configured for carrier aggregation of CC #s 1, 2 and 3 of FIG. 1B, the second bit series 212 having that same value 011 may map to indicate that CC#s 1 and 2 are activated. In the former case the DCI format is sent obviously on CC#1 and in the latter case it is sent on CC#3, since prior to the new activations those are the only CCs over which the UE is connected.

The example DCI format 1AA at FIG. 2B is, in an exemplary embodiment, the same size as the conventional DCI format 1A at FIG. 2A. It may be that for a particular embodiment there is a new DCI (PDCCH) format that does not fit into one of the pre-existing DCI formats due to the size of the bit-to-CC mapping, and so those embodiments will use some other DCI format size other than that of the conventional format 1A to support this larger mapping. Other embodiments can use a small enough mapping to stay within the size of already existing DCI formats such as format 1A, such as by conditioning the mapping on the CC configuration as well as the signaled bits as noted above. It is preferable not to add DCI format sizes since each size differential increases the blind searching for a PDCCH that the UEs have to undergo to find their PDCCH.

Now that the UE has received that new DCI format as detailed above, it needs to acknowledge to the eNB that sent it that the UE has in fact received the activation. Otherwise the eNB may assume a CC is activated and send data or a PDCCH on the new CC but the UE which never received the activation indication will never receive that new data or PDCCH on the new CC. Regardless of which of the above activation approaches is used, in an embodiment the preamble which the UE sends to the eNB on the newly activated CC UL indicates to the eNB that the UE has received the activation message

200. The acknowledgement, which in an embodiment is the UE's dedicated preamble indicated by the first bit series 210, also serves as a reference for the eNB to adjust the TA or PC parameter that the UE should use in the corresponding CC. The UE can send the preamble in one of the activated CCs, or alternatively in one of each CC that would require a separate TA. In this manner the UE assists the eNB in deciding the value of the TA or PC parameter (whichever is being used) for any particular CC. In another embodiment, in which there is activated only a DL channel on the newly activated CC, the acknowledgment may be sent and received on an earlier activated UL channel of an earlier activated CC, prearranged between eNB and UE to avoid additional signaling overhead to coordinate which UL channel will be used for the acknowledgment.

The second bit series 212 points to the UL/DL CC pair that should be activated, or it can activate multiple CCs as noted above. Now are detailed exemplary mapping techniques/bitmap types from the second bit series 212 to the selected CC or CCs which can be used in various exemplary embodiments. In a first mapping the bitmap is of DL CCs that are already configured. This enables activation of several CCs simultaneously. All of the UL CCs corresponding to the DL CC are activated at the same time.

In a second mapping the bitmap refers separately to DL CC(s) and UL CC(s) that are configured separately. In a third mapping the bitmap is of UL CC(s) that are already configured. This enables activation of several CC simultaneously. All of the DL CCs corresponding to this UL CC are activated at the same time. In a fourth mapping the bitmap refers directly to E-ARFCN. In a fifth mapping the bitmap uses the mapping specified/signaled for the CIF (either the UL CIF or the DL CIF).

Relevant to the above bit-to-CC mapping, it is possible that there exists a different number DL and UL CC per UE. Though unlikely, this would make it possible that the UL CC might have different mapping than the DL CC. This is overcome by embodiments of the invention because each DL CC would have its paired UL CC in any case, and this pairing needs to be known by the UE, either before activation of the CC or if not known explicitly a default pairing would likely be used. It is more likely that there could be less UL CC than DL CC, but not vice versa based on current developments in LTE-Advanced. This gives rise to the following example mapping possibilities.

In the example DCI format 1AA shown at FIG. 2B, in which the RBA assignment field bits 206 are set '1' and one or more bits of the second bit series 212 are used for CC mapping purposes. There may be three additional bits for CIF in the PDCCH order or more than three bits in the second bit series 212, depending on further progression in development of LTE-Advanced. In this case then in an example embodiment the CC mapping would be done according to DL CC mapping and the dedicated preamble selected by the first bit series 210 would be used in a preamble sent on the corresponding UL CC. These UL and DL CCs would be activated at the same time. The eNB could use the activated CC immediately after a time period T (a predetermined period so it will not need to be separately signaled between eNB and UE) to allocate new resources in the corresponding CC or after it has received on the newly activated CC the dedicated preamble that was assigned by the first bit series 210 in the PDCCH order 200.

In another example embodiment using the same situation as immediately above the mapping field/second bit series 212 would use the UL mapping and all DL carriers that are mapped to the UL CC (which is where the PDCCH order will point) will be activated at the same time as the corresponding UL CC.

If cross carrier scheduling is already enabled with the conventional DCI format 1A, as is assumed in FIG. 2A above, the CIF field (if that field is applied to format 1A) can be reused as in a normal resource grant, with CIF also in the new PDCCH order format 1AA which has bits 212 that are used for activation of a CC. That is, the same mapping as is used for CIF-to-CC is used for the PDCCH order. But in the PDCCH order detailed above there is no grant of resources; the RB assignment field 206 at FIG. 2B is set to all ones and so no resources are granted in either PDCCH order format 1A or format 1AA. However those additional bits in the second bit string 212 of FIG. 2B can also be used for other mapping possibilities besides CC activation. Alternatively these 3 CIF bits could be used to include more bits for any mapping needed in the PDCCH order, whether for CC activation mapping or dedicated preamble mapping or some other mapping.

Independent of the actual mapping scheme, the dedicated RACH preamble for which the first bit series 210 selects will, in the activated CC, be an acknowledgement to the eNB that the UE has received the activation message 200 and can also serve as a reference point when a possible new configuration of some layer 1 L1 parameters will be used (for example, if a PDCCH monitoring set or a UL ACK/NACK configuration will change accordingly, which is not yet finalized in LTE-Advanced).

Alternatively, in an embodiment there is a newly defined format of the PDCCH order. In this format there would be a bit series/bit field that directly indicates the carrier of the CC to be activated, for example in E-ARFCN. For optimized operation this format may in an embodiment also include other lower layer information such as for example an indication of the time at which the UE should take the new PDCCH order into use, and the DL/UL allocation.

For embodiments which adopt a new PDCCH order format, CC activations bits (which may still be the second bit series 212) of the new order could by example refer directly to the E-ARFCN of a carrier to be activated, or it could be an index (number), which refers to a previously known configuration. In this case it may be that the mapping in which the referral would be done is signaled to the UE, for example in an RRC Connection Reconfiguration message, which has been sent to the UE previously when the CCs have been configured. Or this CC activation mapping can be signaled in a separate RRC Connection Reconfiguration message after the CCs have been configured. The new format would also allow more precise timing information for the CC activation to be included (for example, the SFN during which the activation is assumed to be valid.) Additionally, this timing information can be included in the RRC Connection Reconfiguration message, which contains the mappings between the indexes and CC configurations.

So in summary of the above the technical effects of certain embodiments of the invention include making a new DCI format which is the same size as another conventional DCI format (by example, the size of new format 1AA at FIG. 2B is the same as the size of conventional format 1A at FIG. 2A). As noted above there is a first bit series 210, which includes both a preamble index 208 and a mask index 209, to indicate the dedicated preamble. There is also a second bit series 212 which indicates a mapping that informs which CC (or CCs) is to be activated. Note that this example embodiment is not limited to the cases when cross carrier scheduling is available.

Another technical effect of certain embodiments is fast activation of a new CC using the PDCCH order, which solves the reliability problem (and the timing problem) since the eNB would hear the preamble on the activated UL CC which is confirmation that the UE has activated the corresponding DL CC (s). The eNB would also know that the UE will hear the CC (s), since the UE needs to know the RACH location and the UL is limiting the coverage regardless. Then the eNB could also correct the TA and PC parameters from the preamble reception if needed. Note that the presence of the CIF field is not needed: the PDCCH order can be sent without the CIF being configured, which provides the technical effect being able to activate a CC even when it is not possible or desirable to do so with the CIF bits.

FIG. 3 is a signaling diagram showing a UE connected with first CC (CC1) and signaled on CC1 to activate a second CC (CC2) according to an exemplary embodiment of the invention. FIG. 3 begins with the UE 10 in a RRC connected state or mode 300 over CC1 with the eNB 12, during which they exchange data on the downlink 302a and uplink 302b. The RRC connected mode 300 over CC1 remains in place for all of FIG. 3. Assume at the start of FIG. 3 that only CC1 is activated for the UE 10.

At message 304 the eNB 12 sends to the UE 10 a PDCCH order, such as for example the DCI format 1AA of FIG. 2B, which carries the indicator for CC2 (by example, the second bit series 212) and the indication (by example, the first bit series 210) of a dedicated preamble (access codeword) for the UE 10 to use when accessing CC2. At this moment in time the UE 10 does not know which of the several CCs in the whole bandwidth (5 CCs in FIG. 1B) is/are being activated. The UE 10 may be previously configured, via RRC signaling, for a monitoring set of aggregated CCs which is less than all possible CCs. By example, the monitoring set of CCs which make up the UE's aggregated CCs may be CC #s 1, 2 and 3 from FIG. 1B.

At block 306, based on the information in the PDCCH order 304 the UE consults its locally stored map and using the second bit series finds which CC or CCs are activated. In this example CC2 is activated by the PDCCH order 304. The UE 10 activates CC2 for itself by activating dedicated preamble transmissions on CC2. That activating is shown at message 308, in which the UE 10 sends random access bursts on the RACH of the CC2. Each of these bursts 308 on the RACH has the UE's dedicated preamble) for which the UE 10 received an indication thereof in the PDCCH order 304 (via the first bit series).

Eventually the eNB 12 replies to one of those random access bursts by the UE 10 by sending back a random access response 310. Conventionally this response is sent by the eNB on the PDCCH identified by the random access radio network temporary identifier RA-RNTI. The response 310 on the PDCCH may include a resource allocation, TA and PA, among other parameters. The UE 10 becomes formally attached to the eNB 12 via the CC2 using those allocated resources, at which time it is in a RRC connected mode with the eNB 12 on CC2 312 as well as on CC1 which remained from the start.

Figure 4:
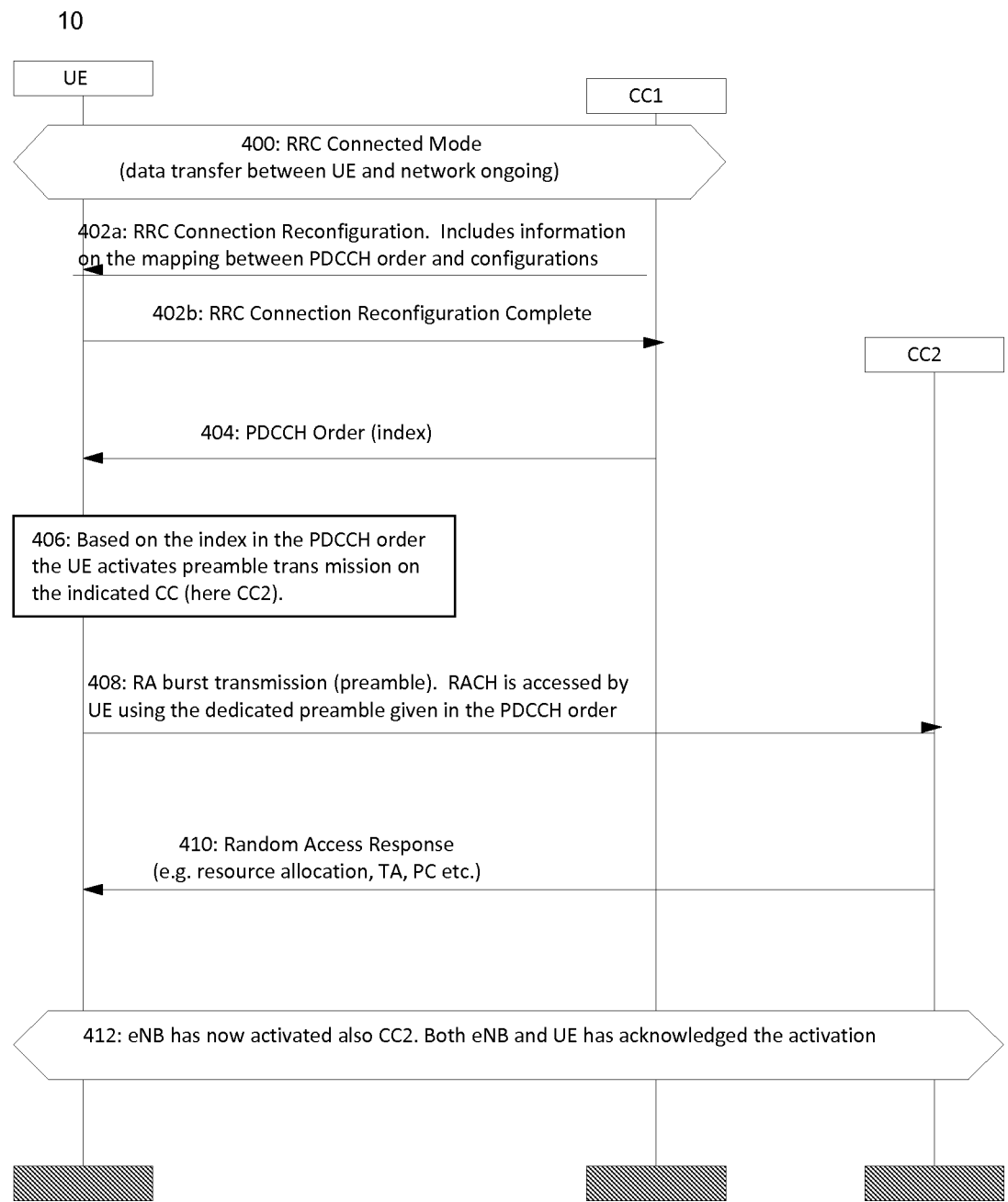
FIG. 4 is a signaling diagram similar to FIG. 3 but showing a different exemplary embodiment of the invention.

FIG. 4 is a signaling diagram similar to FIG. 3 but showing a different exemplary embodiment of the invention in which there is an index pointing to a configuration. As with FIG. 3, assume at the start of FIG. 4 that the UE 10 and the eNB 12 are in an RRC connected mode 400 only on CC1 but that CC2 and CC3 (not shown) are also in the monitoring set of the UE 10.

While still in the RRC connected mode over CC1, the eNB 12 sends to the UE 10 a RRC Connection Reconfiguration message 402a, which tells the UE 10 what bitmap is to be used for finding the proper CC that will be next activated. In an embodiment the eNB provides the bitmap itself in message 402a, or the eNB may indicate the type of mapping to be used. As noted above, the type of mapping referred to here can be an RRC configuration of the UE (previous RRC configurations and possibly also including the current one). Or it can indicate that the mapping in the yet to be sent PDCCH order format will be directly to the E-ARFCN of the carrier to be activated. In any event the UE 10 replies with a RRC Connection Configuration complete message 402b.

At message 404 the eNB 12 sends to the UE 10 its PDCCH order, and due to the previous signaling in message 402a the UE 10 knows how to map the second bit series of the PDCCH order. At block 406, based on the information in the PDCCH order 404 which like FIG. 3 also includes an indication of the dedicated preamble and an indication of the activated CC (which in this case the CC activation indication is for example an index to a RRC configuration or an E-ARFCN). The UE maps a bit series in the PDCCH order using the mapping technique or specific bitmap informed to it at message 402a and finds that CC2 is activated by the PDCCH order 404.

The UE 10 sends random access bursts 408 on the RACH of the CC2, each burst 408 including the dedicated preamble for which the UE 10 received an indication thereof in the PDCCH order 404.

The eNB 12 replies to one of those random access bursts 408 by sending back to the UE 10 on the PDCCH and identified by the RA-RNTI a random access response 410. The response 410 may include a resource allocation, TA and PA, among other parameters. The UE 10 becomes formally attached to the eNB 12 via the CC2 using those allocated resources, at which time it is in a RRC connected mode with the eNB 12 on CC2 412 as well as on CC1 which remained from the start.

Figure 5A:
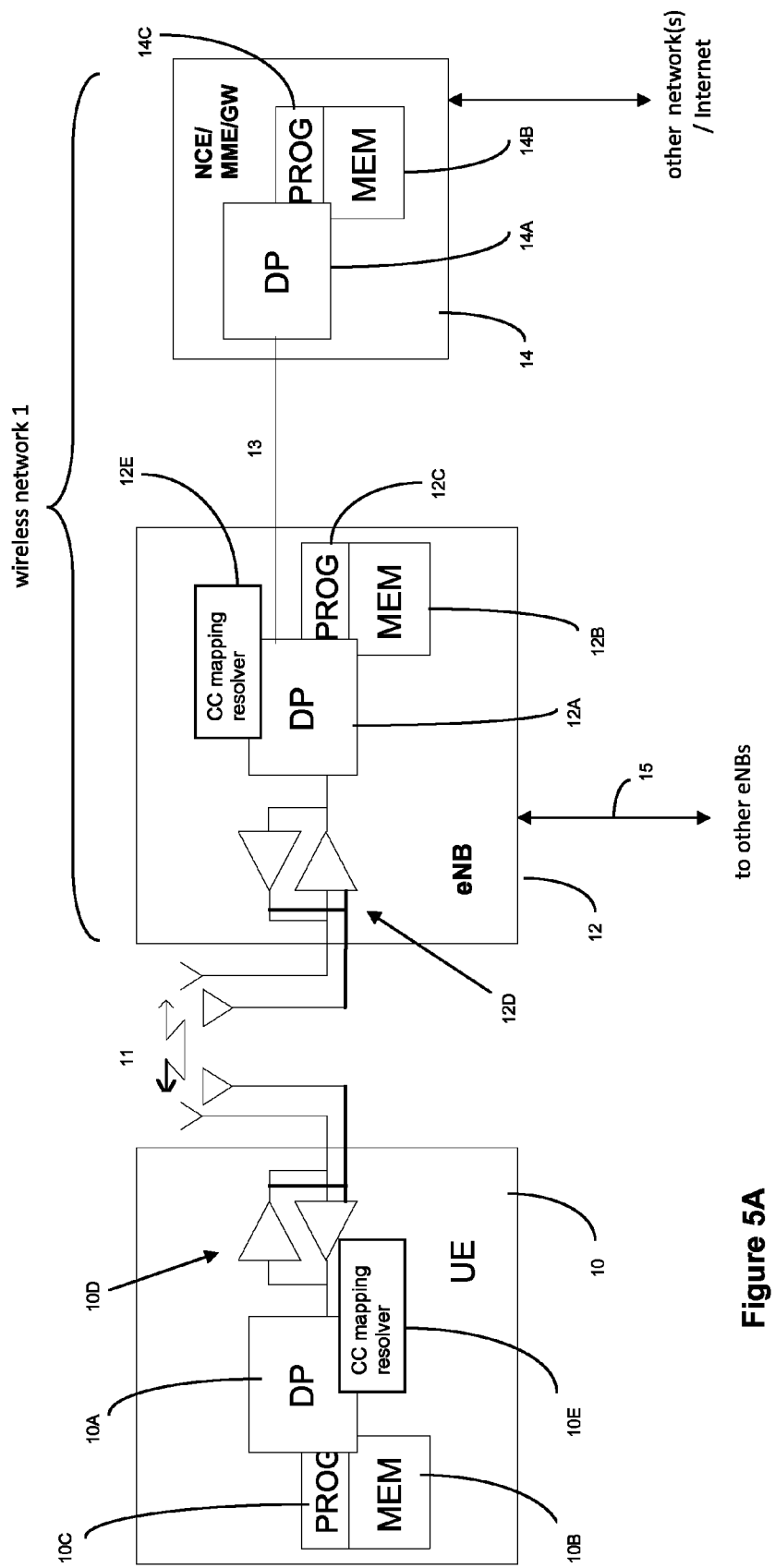
FIG. 5A shows a simplified block diagram of certain apparatus according to various exemplary embodiments of the invention.

Reference is made to FIG. 5A for illustrating a simplified block diagram of various electronic devices and apparatus that are suitable for use in practicing the exemplary embodiments of this invention. In FIG. 5A a wireless network 1 is adapted for communication over a wireless link 11 with an apparatus, such as a mobile communication device which above is referred to as a UE 10, via a network access node, such as a Node B (base station), and more specifically an eNB 12. The network 1 may include a network control element (NCE) 14 that may include the MME/S-GW functionality shown in FIG. 1A, and which provides connectivity with a network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a CC mapping resolver 10E, and the eNB 12 may include a CC mapping resolver 12E, to decide how the bit series is to map to a CC.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

FIG. 5B illustrates further detail of an exemplary UE in both plan view (left) and sectional view (right), and the invention may be embodied in one or some combination of those more function-specific components. At FIG. 5B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 5B are seen multiple transmit/receive antennas 36 that are typically used for cellular communication. The antennas 36 may be multi-band for use with other radios in the UE. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and down-converts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or eNB 12, may operate in a slave relationship to the main processor 10A, 12A, which may then be in a master relationship to them. Embodiments of this invention need not be disposed in any individual processor/chip but may be disposed across various chips and memories as shown or disposed within another processor that combines some of the functions described above for FIG. 5B. Any or all of these various processors of FIG. 5B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 5B.

Note that the various chips (e.g., 38, 40, 42, etc.) that were described above may be combined into a fewer number than described and, in a most compact case, may all be embodied physically within a single chip.

FIG. 6A is a logic flow diagram that illustrates the operation of a method, and a result of execution of computer program instructions, in accordance with the exemplary embodiments of this invention, such as for example from the perspective of the eNB. In accordance with these exemplary embodiments at block 602 there is sent to a UE downlink control information, the downlink control information comprising an indication of an access codeword (for example, a dedicated preamble) and an indication that at least one component carrier of a plurality of aggregated component carriers is activated for the UE. At block 604 there is received from the UE, on an uplink channel which lies in the at least one activated component carrier for the case in which there is an activated UL channel in the activated CC or on a previously activated uplink channel for the case in which there is no activated UL channel in the activated CC, the access codeword which is an acknowledgement that the user equipment has activated the at least one component carrier.

As detailed above, in various embodiments the access codeword received from the user equipment comprises a message preamble; and/or the at least one selected component carrier that is activated comprises at least one uplink resource paired with at least one downlink resource.

In a exemplary embodiment of the FIG. 6A method/apparatus/program the downlink control information comprises a PDCCH order that includes at least a first bit series and a second bit series; and wherein the first bit series is the indication of the access codeword which is a dedicated preamble for accessing the activated at least one component carrier; and wherein the second bit series is the indication that the at least one selected component carrier is activated, and the second bit series selects an entry of a stored bitmap which identifies the at least one selected component carrier that is activated from among the plurality of aggregated component carriers.

In another exemplary embodiment of the FIG. 6A method/apparatus/program the downlink control information is a PDCCH order that is sent to the user equipment on a first component carrier of the plurality of aggregated component carriers from a network element which is in a connected mode with the user equipment; and in which the at least one selected component carrier is not activated for the user equipment at the time the PDCCH order is sent.

FIG. 6B is a logic flow diagram that illustrates the operation of a method, and a result of execution of computer program instructions, in accordance with the exemplary embodiments of this invention, such as for example from the perspective of the UE. In accordance with these exemplary embodiments at block 622 there is received downlink control information from a network, the downlink control information comprising an indication of an access codeword and an indication that at least one selected component carrier of a plurality of aggregated component carriers is activated for a user equipment. At block 624 the received indications are used to select and access the at least one component carrier. At block 626 it is acknowledged that the at least one component carrier is activated by sending the access codeword (by example, the dedicated preamble) on an uplink channel which lies in the at least one activated component carrier for the case in which there is an activated UL channel in the activated CC or on a previously activated uplink channel for the case in which there is no activated UL channel in the activated CC.

As detailed above, in an exemplary embodiment using the received indications comprises: using the indication that the at least one selected component carrier is activated to select, from the plurality of aggregated component carriers, the at least one selected component carrier that is activated; and using the access codeword/dedicated preamble to establish a wireless connection with a network on the at least one component carrier.

As detailed above, in various exemplary embodiments the access codeword comprises a message preamble, and/or the at least one selected component carrier that is activated comprises at least one uplink resource paired with at least one downlink resource.

In another exemplary embodiment the downlink control information comprises a PDCCH order that includes at least a first bit series and a second bit series; wherein the first bit series is the indication of the access codeword which is a dedicated preamble for accessing the activated at least one component carrier; and wherein the second bit series is the indication that the at least one selected component carrier is activated, and the second bit series is used to select an entry of a bitmap stored in a local memory which identifies the at least one selected component carrier that is activated from among the plurality of aggregated component carriers.

In another exemplary embodiment the downlink control information is a PDCCH order that received on a first component carrier of the plurality of aggregated component carriers from a network element which is in a connected mode with the user equipment; and in which the at least one selected component carrier is not activated for the user equipment at the time the PDCCH order is received.

The various blocks shown in FIGS. 6A and/or 6B may be viewed as method steps, and/or as operations that result from operation of computer program code, and/or as a plurality of coupled logic circuit elements constructed to carry out the associated function(s).

For example, the UE and eNB, or one or more components thereof, can form an apparatus comprising at least one processor and at least one memory including computer program code, in which the at least one memory and the computer program code are configured to, with the at least one processor, cause the apparatus to perform the elements shown at FIGS. 6A-B and further recited in further detail above.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE-Advanced system, it should be appreciated that the exemplary embodiments of this invention are not limited for use with only this one particular type of wireless communication system that uses carrier aggregation.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and channels (for example, PDCCH, RACH, etc.) are not intended to be limiting in any respect, as these parameters may be identified by any suitable names. Further, the formulas and expressions that use these various parameters may differ from those expressly disclosed herein.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
sending downlink control information to a user equipment, the downlink control information comprising an indication of an access codeword and an indication indicating that at least one component carrier of a plurality of aggregated component carriers is activated; and
receiving, from the user equipment, a configuration complete message, wherein the access codeword is transmitted from the user equipment as an acknowledgement that the at least one component carrier is activated, and wherein the access codeword indicates a dedicated preamble for accessing the activated at least one component carrier;
wherein the access codeword is received on an uplink channel which lies in the at least one activated component carrier for the case in which there is an activated uplink channel in the at least one activated component carrier, or the access codeword is received on a previously activated uplink channel for the case in which there is no activated uplink channel in the at least one activated component carrier.

2. The method according to claim 1, in which the access codeword received from the user equipment comprises a message preamble.

3. The method according to claim 1, in which the at least one activated component carrier comprises at least one uplink resource paired with at least one downlink resource.

4. The method according to claim 1, in which the downlink control information comprises a physical downlink control channel order that includes at least a first bit series and a second bit series;
wherein the first bit series is the indication of the access codeword;
and wherein the second bit series is the indication indicating that the at least one component carrier is activated, and the second bit series selects an entry of a stored bitmap which identifies the at least one component carrier that is activated from among the plurality of aggregated component carriers.

5. The method according to claim 1, in which the downlink control information is a physical downlink control channel order that is sent to the user equipment on a first component carrier of the plurality of aggregated component carriers from a network element which is in a connected mode with the user equipment;
and in which the at least one component carrier is not activated for the user equipment at the time the order is sent.

6. An apparatus comprising:
at least one processor; and
at least one memory including computer program code;
in which the at least one memory and the computer program code are configured, with the at least one processor, to cause the apparatus at least to:
send downlink control information to a user equipment, the downlink control information comprising an indication of an access codeword and an indication indicating that at least one component carrier of a plurality of aggregated component carriers is activated; and
receive, from the user equipment, a configuration complete message, wherein the access codeword is transmitted from the user equipment as an acknowledgement that the at least one component carrier is activated, and wherein the access codeword indicates a dedicated preamble for accessing the activated at least one component carrier;
wherein the access codeword is received on an uplink channel which lies in the at least one activated component carrier for the case in which there is an activated uplink channel in the at least one activated component carrier, or the access codeword is received on a previously activated uplink channel for the case in which there is no activated uplink channel in the at least one activated component carrier.

7. The apparatus according to claim 6, in which the access codeword received from the user equipment comprises a message preamble.

8. The apparatus according to claim 6, in which the at least one activated component carrier comprises at least one uplink resource paired with at least one downlink resource.

9. The apparatus according to claim 6, in which the downlink control information comprises a physical downlink control channel order that includes at least a first bit series and a second bit series;
wherein the first bit series is the indication of the access codeword;
and wherein the second bit series is the indication that the at least one component carrier is activated, and the second bit series selects an entry of a stored bitmap which identifies the at least one component carrier that is activated from among the plurality of aggregated component carriers.

10. The apparatus according to claim 6, in which the downlink control information is a physical downlink control channel order that is sent to the user equipment on a first component carrier of the plurality of aggregated component carriers from a network element which is in a connected mode with the user equipment;
and in which the at least one component carrier is not activated for the user equipment at the time the order is sent.

11. A method comprising:
receiving downlink control information from a network, the downlink control information comprising an indication of an access codeword, and an indication indicating that at least one component carrier of a plurality of aggregated component carriers is activated;
using the received indications to access the at least one component carrier; and
acknowledging that the at least one component carrier is activated by sending the access codeword,
wherein the access codeword is sent on an uplink channel which lies in the at least one activated component carrier for the case in which there is an activated uplink channel in the at least one activated component carrier, or the access codeword is sent on a previously activated uplink channel for the case in which there is no activated uplink channel in the at least one activated component carrier; and
wherein the access codeword indicates a dedicated preamble for accessing the activated at least one component carrier.

12. The method according to claim 11, in which using the received indications comprises:

using the indication indicating that the at least one selected component carrier is activated to select, from the plurality of aggregated component carriers, the at least one selected component carrier that is activated; and using the access codeword to establish a wireless connection with the network on the at least one component carrier.

13. The method according to claim 11, in which the access codeword comprises a message preamble.

14. The method according to claim 11, in which the at least one selected component carrier that is activated comprises at least one uplink resource paired with at least one downlink resource.

15. The method according to claim 11, in which the downlink control information comprises a physical downlink control channel order that includes at least a first bit series and a second bit series;

wherein the first bit series is the indication of the access codeword;

and wherein the second bit series is the indication indicating that the at least one selected component carrier is activated, and the second bit series is used to select an entry of a stored bitmap which identifies the at least one selected component carrier that is activated from among the plurality of aggregated component carriers.

16. The method according to claim 11, in which the downlink control information is a physical downlink control channel order that is received on a first component carrier of the plurality of aggregated component carriers from a network element which is in a connected mode with the user equipment which executes the method;

and in which the at least one selected component carrier is not activated for the user equipment at the time the order is received.

17. An apparatus comprising:
at least one processor; and
at least one memory including computer program code;
in which the at least one memory and the computer program code are configured, with the at least one processor, to cause the apparatus at least to:
receive downlink control information from a network, the downlink control information comprising an indication of an access codeword, and an indication indicating that at least one component carrier of a plurality of aggregated component carriers is activated;
use the received indications to access the at least one component carrier; and
acknowledge that the at least one component carrier is activated by sending the access codeword, wherein the access codeword is sent on an uplink channel which lies in the at least one activated component carrier for the case in which there is an activated uplink channel in the at least one activated component carrier, or the access codeword is sent on a previously activated uplink channel for the case in which there is no activated uplink channel in the at least one activated component carrier, and wherein the access codeword is a dedicated preamble for accessing the activated at least one component carrier.

18. The apparatus according to claim 17, in which the at least one memory and the computer program code to cause the apparatus to use the received indications further configured, with the at least one processor, to cause the apparatus at least to:

use the indication indicating that the at least one selected component carrier is activated to select, from the plurality of aggregated component carriers, the at least one selected component carrier that is activated; and use the access codeword to establish a wireless connection on the at least one component carrier.

19. The apparatus according to claim 17, in which the access codeword comprises a message preamble.

20. The apparatus according to claim 17, in which the at least one selected component carrier that is activated comprises at least one uplink resource paired with at least one downlink resource.

21. The apparatus according to claim 17, in which the downlink control information comprises a physical downlink control channel order that includes at least a first bit series and a second bit series;

wherein the first bit series is the indication of the access codeword;

and wherein the second bit series is the indication indicating that the at least one selected component carrier is activated, and the second bit series is used to select an entry of a stored bitmap which identifies the at least one selected component carrier that is activated from among the plurality of aggregated component carriers.

22. The apparatus according to claim 17, in which the downlink control information is a physical downlink control channel order that is received on a first component carrier of the plurality of aggregated component carriers from a network element which is in a connected mode with the user equipment which executes the method;

and in which the at least one selected component carrier is not activated for the user equipment at the time the order is received.

* * * * *